United States Patent
Tabe et al.

(10) Patent No.: US 9,002,172 B2
(45) Date of Patent: Apr. 7, 2015

(54) ELECTRONIC APPARATUS AND IMAGE PROCESSING METHOD

(75) Inventors: Kenichi Tabe, Ome (JP); Kohei Momosaki, Mitaka (JP); Kouetsu Wada, Nishitama-gun (JP); Tomonori Sakaguchi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 13/161,422

(22) Filed: Jun. 15, 2011

(65) Prior Publication Data

US 2011/0311198 A1  Dec. 22, 2011

(30) Foreign Application Priority Data

Jun. 16, 2010 (JP) ................... 2010-137675

(51) Int. Cl.
*H04N 5/932* (2006.01)
*H04N 5/76* (2006.01)
*G11B 27/034* (2006.01)
*G11B 27/10* (2006.01)
*G11B 27/28* (2006.01)

(52) U.S. Cl.
CPC ............... *H04N 5/76* (2013.01); *G11B 27/034* (2013.01); *G11B 27/105* (2013.01); *G11B 27/28* (2013.01)

(58) Field of Classification Search
None
See application file for complete search history.

(56) References Cited

U.S. PATENT DOCUMENTS

| 8,238,667 | B2 | 8/2012 | Hosaka et al. | |
| 2006/0182426 | A1* | 8/2006 | Yoneyama et al. | 386/120 |
| 2007/0065110 | A1* | 3/2007 | Juen et al. | 386/95 |
| 2009/0211663 | A1* | 8/2009 | Olesen et al. | 141/94 |
| 2011/0246571 | A1* | 10/2011 | Klier et al. | 709/203 |

FOREIGN PATENT DOCUMENTS

| JP | 2000-067057 A | 3/2000 |
| JP | 2004-336682 A | 11/2004 |
| JP | 2006-164008 A | 6/2006 |
| JP | 2006-166147 A | 6/2006 |
| JP | 2007-256971 A | 10/2007 |

(Continued)

OTHER PUBLICATIONS

First Office Action mailed by Japan Patent Office on Sep. 6, 2011 in the corresponding to Japanese patent application No. 2010-137675.

(Continued)

*Primary Examiner* — William C Vaughn, Jr.
*Assistant Examiner* — Eileen Adams
(74) *Attorney, Agent, or Firm* — Knobbe, Martens, Olson & Bear, LLP

(57) ABSTRACT

According to one embodiment, an electronic apparatus includes an indexing module, a first playback module, a first image select module, an image extraction module, and a second playback module. The indexing module is configured to generate index information indicative of attributes of a plurality of still images. The first playback module is configured to play back a first moving picture by using the plurality of still images. The first image select module is configured to select a first still image from the plurality of still images. The image extraction module is configured to extract a still image group including still images relevant to the first still image, based on the index information. The second playback module is configured to play back, in place of the first moving picture, a second moving picture by using the still image group.

15 Claims, 10 Drawing Sheets

(56) References Cited

FOREIGN PATENT DOCUMENTS

| JP | 2007-306426 A | 11/2007 |
| JP | 2009-038826 A | 2/2009 |
| JP | 2009-055152 A | 3/2009 |
| JP | 2009-071718 A | 4/2009 |
| JP | 2009-188870 A | 8/2009 |
| JP | 2009-296504 A | 12/2009 |

OTHER PUBLICATIONS

First Office Action mailed by Japan Patent Office on Jan. 17, 2012 in the corresponding to Japanese patent application No. 2010-137675.
First Office Action dated Jul. 30, 2013 of corresponding Japanese Patent Application 2012-121799—6 pages.

* cited by examiner

| Image ID | Date/time of generation | Location of generation | Event ID | Face image information (1) | | | | | | |
|---|---|---|---|---|---|---|---|---|---|---|
| | | | | Face image | Person ID | Position | Size | Smile degree | Sharpness | Frontality | ... |
| 000 | ... | ... | ... | | ... | ... | ... | ... | ... | ... | ... |
| 001 | ... | ... | ... | | ... | ... | ... | ... | ... | ... | ... |
| 002 | ... | ... | ... | | ... | ... | ... | ... | ... | ... | ... |
| 003 | ... | ... | ... | | ... | ... | ... | ... | ... | ... | ... |
| 004 | ... | ... | ... | | ... | ... | ... | ... | ... | ... | ... |
| ... | ... | ... | ... | | ... | ... | ... | ... | ... | ... | ... |

↖ 302A

F I G. 4

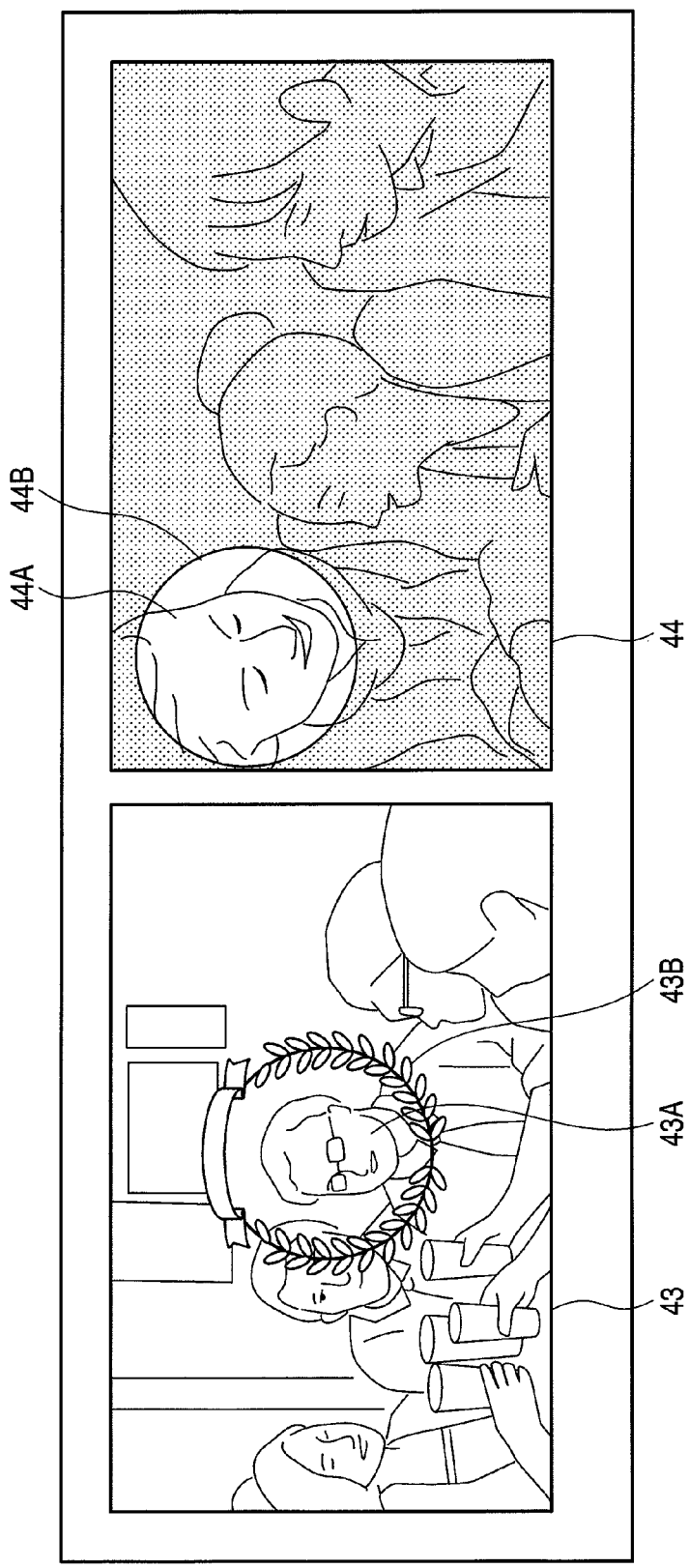
F I G. 7

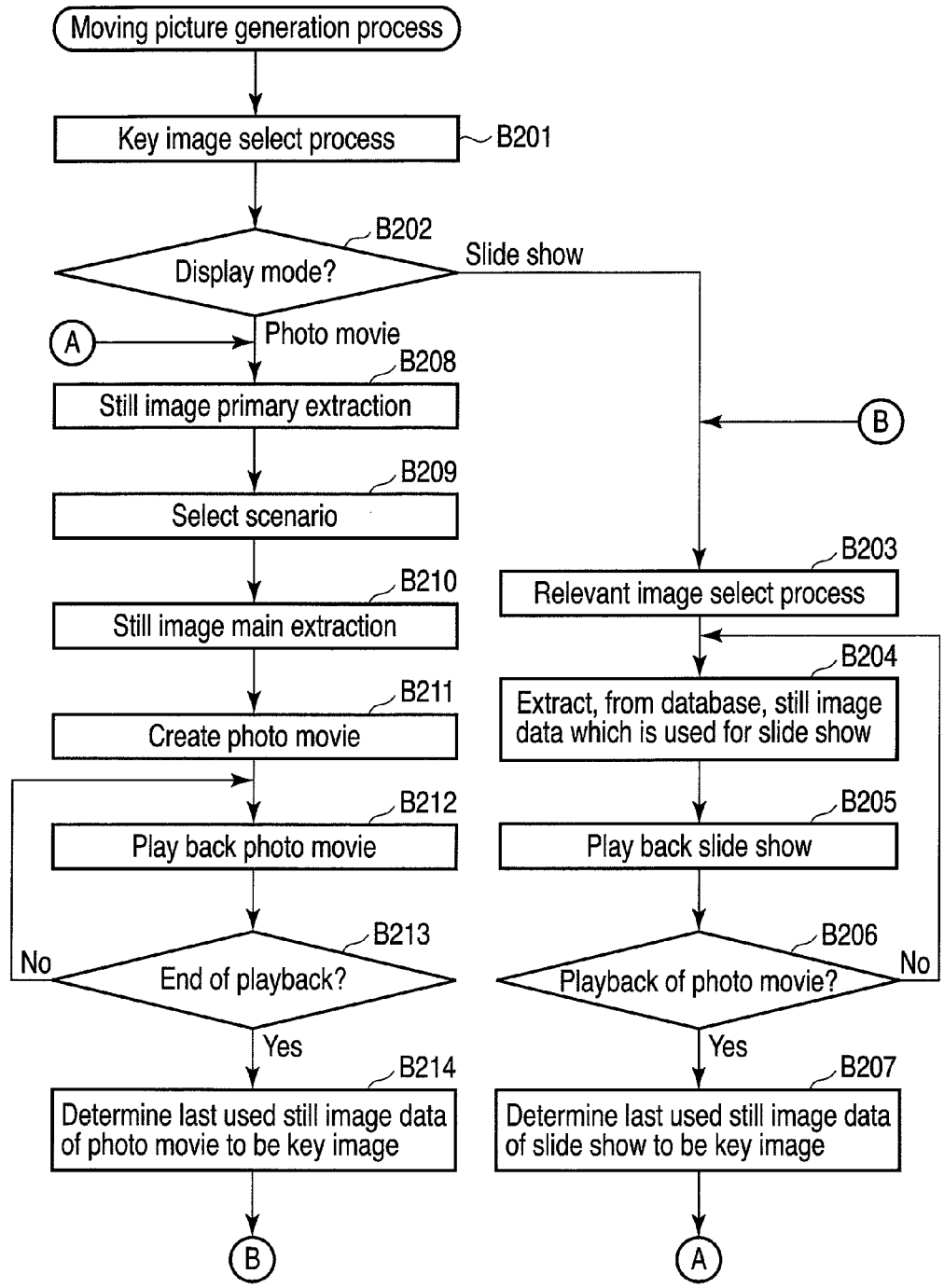
F I G. 9

US 9,002,172 B2

ELECTRONIC APPARATUS AND IMAGE PROCESSING METHOD

CROSS-REFERENCE TO RELATED APPLICATIONS

This application is based upon and claims the benefit of priority from Japanese Patent Application No. 2010-137675, filed Jun. 16, 2010; the entire contents of which are incorporated herein by reference.

FIELD

Embodiments described herein relate generally to an electronic apparatus which displays an image, and an image processing method.

BACKGROUND

In recent years, various electronic apparatuses, such as a personal computer, a digital camera and a PDA, have been gaining in popularity. Such an electronic apparatus has a function of managing still images such as photos. As an image management method, there is known a method of classifying photos into a plurality of groups, for example, based on date/time data which is added to the photos.

In addition, recently, attention has been paid to a moving picture creation technique for creating a moving picture (e.g. photo movie, slide show, etc.) by using still images such as photos. As the moving picture creation technique, for example, there is known a technique wherein still images are classified into a plurality of directories corresponding to a plurality of dates/times of imaging and are stored, and a moving picture is created by using still images in a directory designated by a user.

In an electronic apparatus which displays a slide show, for example, characteristic amounts of images which are stored are extracted, and the degree of similarity between a designated key image and the images is calculated. According to image sort results based on degrees of similarity or a variation function of the degree of similarity, the images are successively selected and displayed.

However, in the method in which the user is made to designate the directory that is a processing target, the still images which are displayed are limited to the still images in the designated directory. It is thus difficult to present to the user a moving picture including unexpected still images (still images, of which the user is unaware), or still images which are not stored in the same directory but have high relevance.

In addition, in the slide show, images that are to be displayed are merely selected successively from still images and are displayed. Thus, it is desired to provide a moving picture which can more interest the user and has a higher audio-visual effect.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary view showing an example of index information which is used by the moving picture creation application program which is executed by the electronic apparatus of the embodiment.

FIG. 7 is an exemplary view showing an example of a photo movie to which an effect has been applied, the photo movie being displayed by the electronic apparatus of the embodiment.

FIG. 9 is an exemplary flowchart illustrating an example of the procedure of a moving picture creation process which is executed by the electronic apparatus of the embodiment.

DETAILED DESCRIPTION

Various embodiments will be described hereinafter with reference to the accompanying drawings.

In general, according to one embodiment, an electronic apparatus comprises an indexing module, a first playback module, a first image select module, a first image extraction module, and a second playback module. The indexing module is configured to generate index information indicative of attributes of a plurality of still images. The first playback module is configured to play back a first moving picture by using the plurality of still images. The first image select module is configured to select a first still image from the plurality of still images. The first image extraction module is configured to extract a first still image group comprising still images relevant to the first still image, based on the index information. The second playback module is configured to play back a second moving picture by using the first still image group, in place of the first moving picture.

Figure 1:
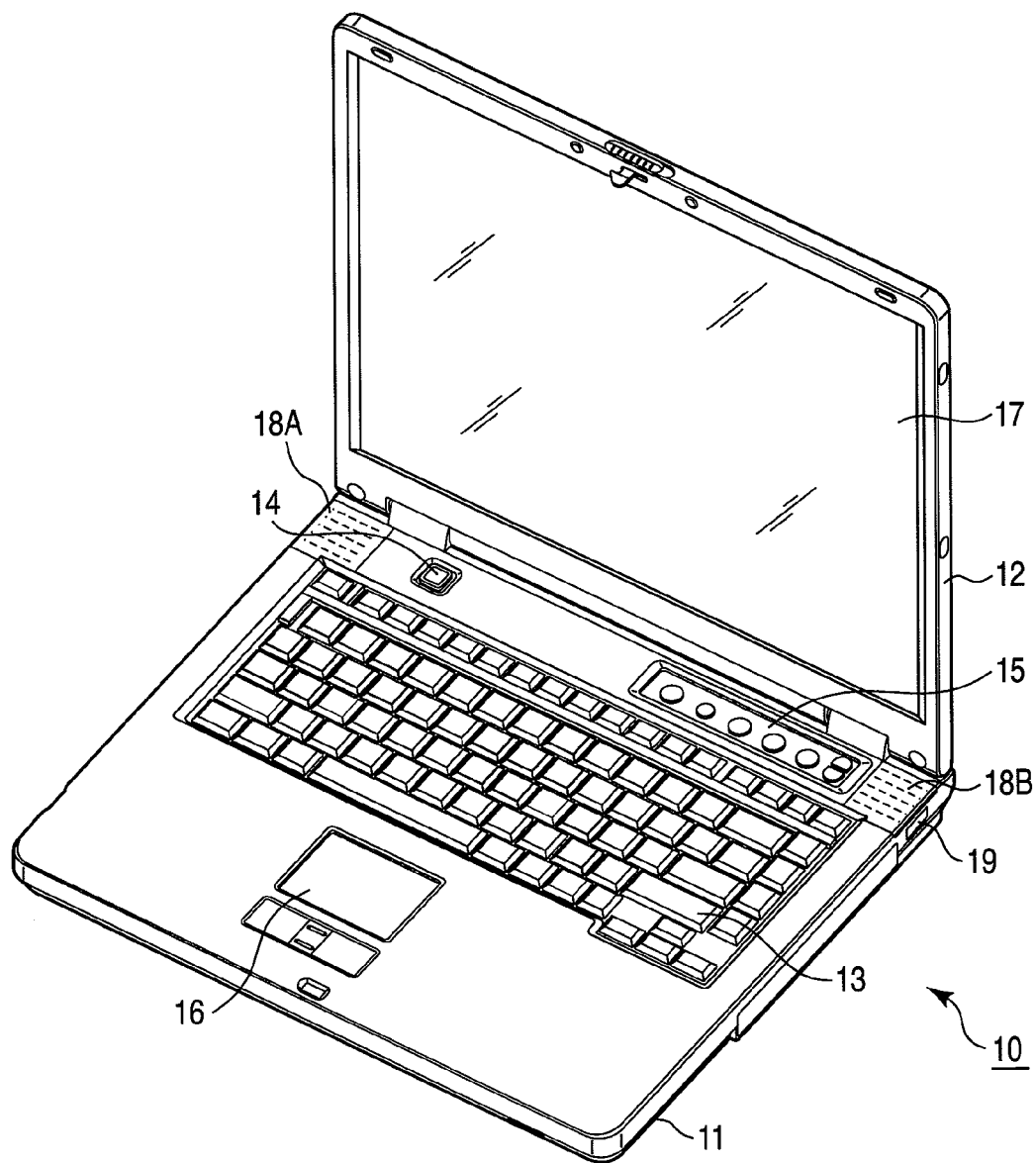
FIG. 1 is an exemplary perspective view showing the external appearance of an electronic apparatus according to an embodiment.

FIG. 1 is an exemplary perspective view showing the external appearance of an electronic apparatus according to an embodiment. The electronic apparatus is realized, for example, as a notebook-type personal computer 10. As shown in FIG. 1, the computer 10 comprises a computer main body 11 and a display unit 12. An LCD (liquid crystal display) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the USB (universal serial bus) 2.0 standard.

Figure 2:
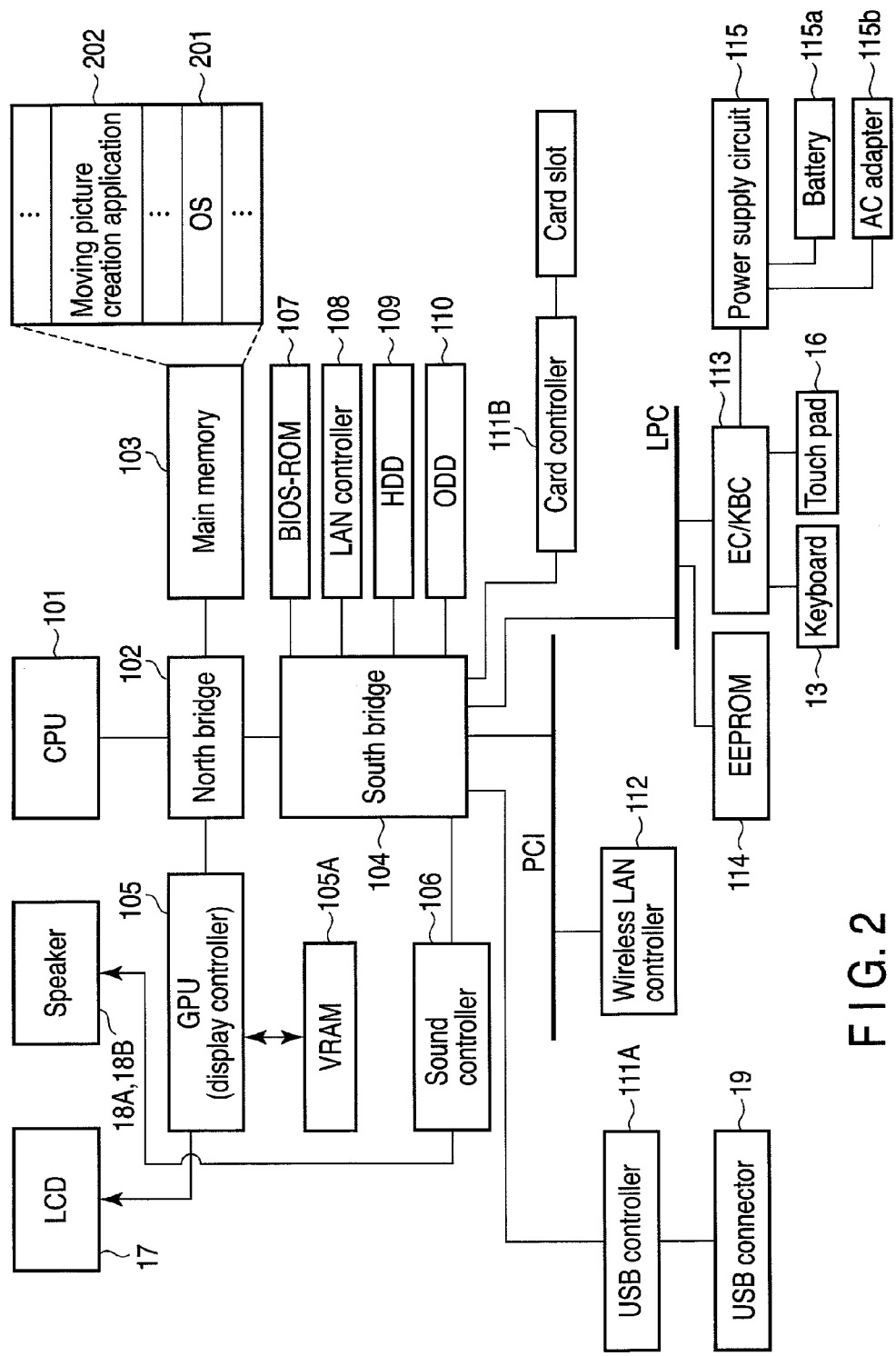
FIG. 2 is an exemplary block diagram showing the system configuration of the electronic apparatus of the embodiment.

FIG. 2 is an exemplary view showing the system configuration of the computer 10.

The computer 10, as shown in FIG. 2, includes a CPU (central processing unit) 101, a north bridge 102, a main memory 103, a south bridge 104, a GPU (graphics processing unit) 105, a VRAM (video random access memory) 105A, a sound controller 106, a BIOS-ROM (basic input/output system-read only memory) 107, a LAN (local area network) controller 108, a hard disk drive (HDD) 109, an optical disc drive (ODD) 110, a USB controller 111A, a card controller 111B, a wireless LAN controller 112, an embedded controller/keyboard controller (EC/KBC) 113, and an EEPROM (electrically erasable programmable ROM) 114.

The CPU 101 is a processor for controlling the operations of the respective components in the computer 10. The CPU 101 executes an operating system (OS) 201 and various application programs, such as a moving picture creation application program 202, which are loaded from the HDD 109 into the main memory 103. The moving picture creation application program 202 is software which plays back various digital contents which are stored in, e.g. the HDD 109. The moving picture creation application program 202 has a moving picture generation function. The moving picture generation function is a function of creating a moving picture (slide show (first moving picture), photo movie (second moving picture)) by using materials (digital contents) such as still images stored in, e.g. the HDD 109. Further, the moving picture generation function includes a function of analyzing the materials which are used for the moving picture. The moving picture creation application program 202 plays back the moving picture which is created by using the materials, and displays the moving picture on the screen (LCD 17).

The CPU 101 executes a BIOS that is stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of communicating with the GPU 105 via, e.g. a PCI EXPRESS serial bus.

The GPU 105 is a display controller which controls the LCD 17 that is used as a display monitor of the computer 10. A display signal, which is generated by the GPU 105, is sent to the LCD 17.

The south bridge 104 controls devices on a PCI (peripheral component interconnect) bus and devices on an LPC (low pin count) bus. The south bridge 104 includes an IDE (integrated drive electronics) controller for controlling the HDD 109 and ODD 110. The south bridge 104 also has a function of communicating with the sound controller 106.

The sound controller 106 is a sound source device and outputs audio data, which is a playback target, to the speakers 18A and 18B. The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 111A communicates with an external device which supports, e.g. the USB 2.0 standard (the external device is connected via the USB connector 19). For example, the USB controller 111A is used in order to receive an image data file which is stored in, for example, a digital camera. The card controller 111B executes data write and data read in/from a memory card such as an SD card, which is inserted in a card slot provided in the computer main body 11.

The EC/KBC 113 is a one-chip microcomputer in which an embedded controller for power management and a keyboard controller for controlling the keyboard 13 and touch pad 16 are integrated. The EC/KBC 113 has a function of controlling a power supply circuit 115 in accordance with the user's operation of the power button 14, and powering on/off the computer 10.

The power supply circuit 115 generates operation power to the respective components by receiving power from a battery 115a which is inserted in the computer main body 11, or power from an external power supply which is connected via an AC adapter 115b. The power supply circuit 115 is provided with a power supply microcomputer. The power supply microcomputer monitors the power supply (charge/discharge) to the respective components and battery, the charging state (residual battery capacity) of the battery 115a, and the connection/disconnection of the AC adapter 115b (the presence/absence of power supply from the outside).

Figure 3:
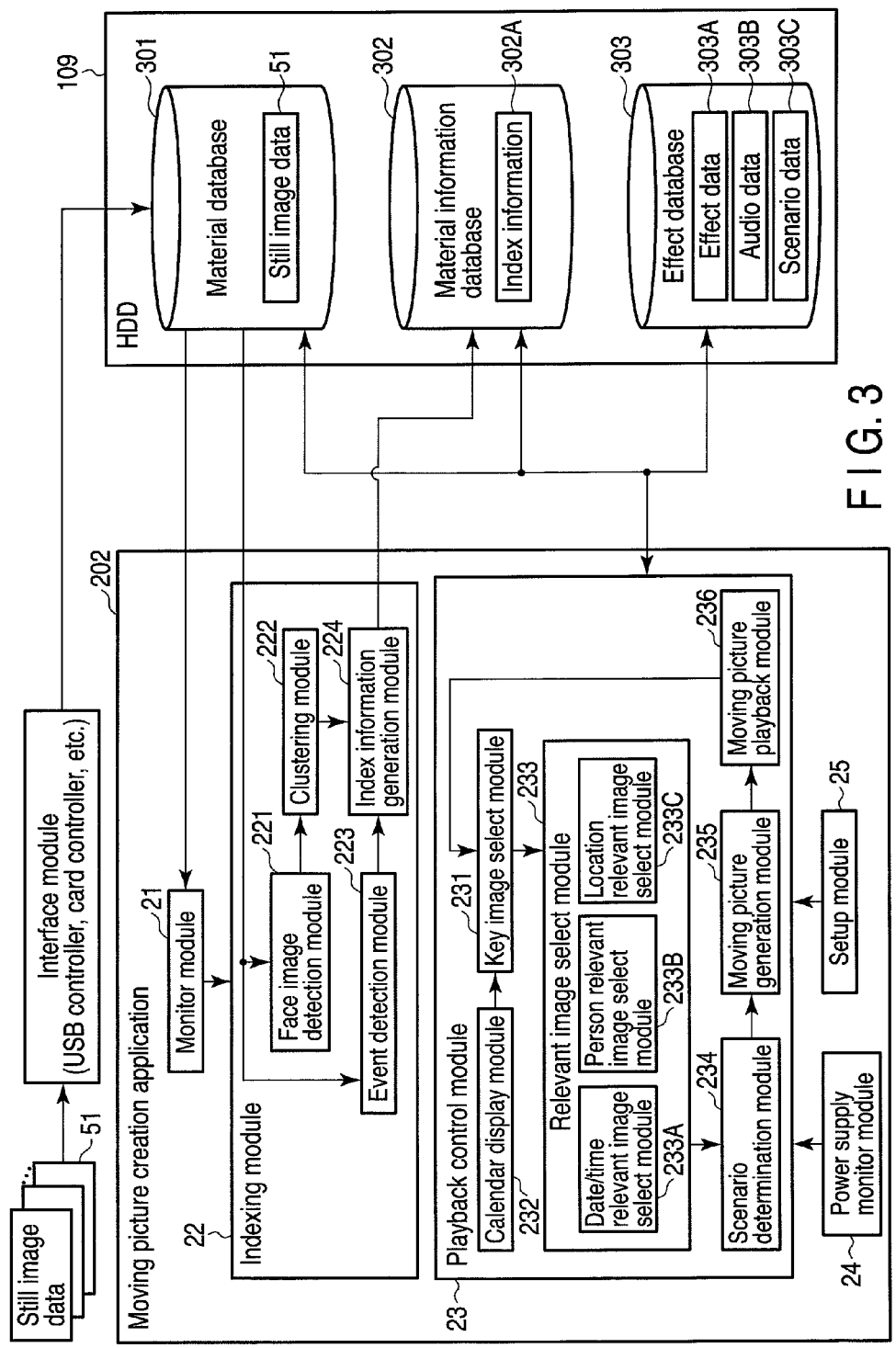
FIG. 3 is an exemplary block diagram showing the functional structure of a moving picture creation application program which is executed by the electronic apparatus of the embodiment.

Next, referring to FIG. 3, a functional structure of the moving picture creation application program 202 is described.

A description is given of a structure example for realizing a moving picture generation function, which is one of the functions of the moving picture creation application program 202. The moving picture generation function is a function for creating a moving picture (e.g. photo movie, slide show) by using still images (still image data) 51 stored in a predetermined directory (folder) in the HDD 109, and playing back the created moving picture. The still images 51 are, for instance, digital photos, or other various still image files (e.g. JPEG (Joint Photographic Experts Group) files). The term "photo movie" refers to a moving picture (movie) which is generated by using still images (e.g. photos). In the playback of the photo movie, various effects or transitions are applied to the still images. The still images, to which the effects or transitions have been applied, are played back together with music. The moving picture creation application program 202 can automatically extract still images which are relevant to a certain still image (key image), and can create and play back the photo movie by using the extracted still images. The term "slide show" refers to a moving picture (movie) which successively displays the still images one by one.

The moving picture creation application program 202 monitors the folder (photo folder) in the HDD 109, which is set by the user. If the moving picture creation application program 202 detects that one or more new still images (photo files) have been stored in the photo folder, the moving picture creation application program 202 executes indexing of the one or more new still images and, at the same time, starts a slide show of the one or more new still images. If the indexing is completed, the moving picture creation application program 202 creates a photo movie based on the one or more new still images, and plays back the created photo movie. In this case, for example, a photo movie may be created from only the one or more new still images, and the created photo movie may be played back. Alternatively, still images relevant to the one or more new still images may be extracted from the still images in the photo folder, a photo movie may be created by using the one or more new still images and the extracted still images, and the photo movie may be played back.

The creation of the photo movie is executed based on one still image (key image). Specifically, still images comprising a plurality of still images relevant to a selected key image are automatically extracted, and a photo movie is created by using the extracted still images. Each of a style, music and a person (face) of interest can be designated as a condition for creating a photo movie. According to the selected style, a still image extraction method to be used, an effect/transition to be used, etc. are determined. In the prior art, photos which are used in creating a movie are designated by the user. On the other hand, the moving picture creation application program 202 automatically extracts photos, which are to be used, from all still images in the photo folder. Thereby, unexpected photos can be found and shown to the user.

In the extraction process, photos with better photographic quality may be extracted according to the smile degree of face images, the sharpness of face images, etc. In addition, a person corresponding to each face image may be recognized by face clustering, and it is possible to extract, for example, photos including face images of the selected person, or photos including face images of another person who has relevance to the selected person. Furthermore, photos may be classified into a plurality of events by using an event grouping technique. In this case, the relevance between events may be estimated based on the relationship between appearing persons in a certain event and appearing persons in another event, and the result of estimation may be used in the extraction process. For example, events in which the same person appears may be estimated to be relevant. For example, the frequency (co-occurrence frequency), with which a person A and another person B appear in the same photo, is high, it may be estimated that an event, to which a photo including the person A belongs, is relevant to an event to which a photo including the person B belongs.

The moving picture creation application program 202 includes a monitor module 21, an indexing module 22, a playback control module 23, a power supply monitor module 24 and a setup module 25.

The monitor module 21 monitors the material database 301 in the HDD 109 at all times, and determines whether a new still image 51 has been stored in the material database 301 in the HDD 109 via an interface module such as the USB controller 111A or card controller 111B. The material database 301 corresponds to a predetermined directory (the above-described photo folder) in the HDD 109. The still image 51 stored in the material database 301 is used as a material candidate of a moving picture (photo movie, slide show). Not only the still images 51, but also a moving picture, such as a short movie, may be stored as a material candidate in the material database 301.

The indexing module 22 analyzes the still images 51 in the material database 301, and generates index information indicative of an attribute of each of the still images 51. The indexing by the indexing module 22 is started, for example, triggered by the storage of one or more new still images (photo files) in the material database 301. In other words, when one or more new still images have been stored in the material database 301, the indexing module 22 generates the index information corresponding to the new still image(s).

The indexing module 22 has a face recognition function. The index information also includes a recognition result of face images included in the still images 51.

The indexing module 22 includes a face image detection module 221, a clustering module 222, an event detection module 223 and an index information generation module 224.

The face image detection module 221 detects a face image from the still image 51 that is a target of indexing (e.g. a still image newly stored in the photo folder). The face image can be detected, for example, by analyzing the features of the still image 51 and searching for a region having a feature similar to a face image feature sample which is prepared in advance. The face image feature sample is characteristic data which is obtained by statistically processing face image features of many persons. By the face detection process, the region corresponding to the face image included in the still image 51 is detected, and the position (coordinates) and size of the region are detected.

In addition, the face image detection module 221 analyzes the detected face image. The face image detection module 221 calculates, for example, the smile degree, sharpness, frontality, etc. of the detected face image. The smile degree is an index indicative of the degree of a smile of the detected face image. The sharpness is an index indicative of the degree of sharpness of the detected face image (e.g. non-blurredness). The frontality is an index indicative of the degree at which the detected face image is directed to the front side. The face image detection module 221 outputs the information indicative of the detected face image to the clustering module 222.

The clustering module 222 subjects the detected face image to a clustering process, thereby classifying the detected face image on a person-by-person basis. Face images having similar face image features are recognized as the face images of the same person. Based on the result of the clustering process, the clustering module 222 allocates identification information (person ID) of the person to each face image. The same person ID is allocated to the face images of the same person. The clustering module 222 outputs the attribute of each face image (the smile degree, sharpness, frontality, person ID) to the index information generation module 224.

The event detection module 223 detects an event corresponding to the still image 51 which is an indexing target. The event detection module 223 classifies, for example, based on the date/time of generation (date/time of imaging) of the still image 51 of the indexing target, this still images 51 of the indexing target into the same event as other still images which were generated within a predetermined period (e.g. one day). The event detection module 223 allocates to the still images 51 of the indexing target the identification information (event ID) of the event to which the still image 51 of the indexing target has been classified. The event detection module 223 outputs the event ID, which has been allocated to the still image 51 of the indexing target, to the index information generation module 224.

The index information generation module 224 generates index information, based on the processing results by the face image detection module 221 and clustering module 222.

FIG. 4 shows a structure example of the index information 302A. The index information 302A includes a plurality of entries corresponding to the still images 51. Each entry includes an image ID, a date/time of generation (date/time of imaging), a location of generation (location of imaging), an event ID, and face image information. In the entry corresponding to a certain still image, the image ID is indicative of identification information which is unique to the still image. The date/time of generation is indicative of the date/time (date/time of imaging) at which the still image was generated. The location of generation is indicative of the location (position) where the still image was generated (captured). For example, information, which is added to the still image data, is used for the date/time of generation and the location of generation. The location of generation is indicative of, for example, position information which is detected by a GPS receiver when the still image data is generated (e.g. when the photo corresponding to the still image data is taken). The event ID is indicative of identification information which is uniquely allocated to the event corresponding to the still image. The face image information is recognition result information of face images included in the still image. The face image information includes, for example, a face image (e.g. a path indicating the location of storage of the face image), person ID, position, size, smile degree, sharpness and frontality. When a plurality of face images are included in one still image 51, the index information 302A corresponding to the one still image 51 includes face image information corresponding to each of the face images.

The index information generation module 224 stores the generated index information 302A in the material information database 302.

By the above-described structure, the indexing module 22 can generate the index information 302A corresponding to the still image 51 that is input, and can store the generated index information 302A in the material information database 302.

The playback control module 23 extracts, based on the index information 302A, still images which are relevant to a selected still image (key image) from the still images 51 in the material database 301, and creates and plays back a photo movie or slide show by using the relevant still images.

When the moving picture creation application program 202 is started, the playback control module 23 basically executes playback of a slide show, and plays back a photo movie, in place of the slide show, at a timing of the start of the playback of the photo movie, which is set by the setup module 25 according to the user's designation. In addition, the playback control module 23 can control the playback of the photo movie in accordance with the state of power supply which is managed by the power supply monitor module 24.

The playback control module 23 comprises, for example, a key image select module 231, a calendar display module 232, a relevant image select module 233, a scenario determination module 234, a moving picture generation module 235, and a moving picture playback module 236.

The key image select module 231 selects a key image (key still image) from still images 51 stored in the material database 301. The key image select module 231 may also determine a still image, which is included in a moving picture (photo movie or slide show) that is being displayed, to be the key image. Specifically, when an image in a photo movie or slide show, which is being played back, is designated, the key image select module 231 determines the designated image to be the key image. If a key image is not designated by the user while the photo movie or slide show is being played back, the key image select module 231 may determine the last still image, which is included in the played-back photo movie or slide show, to be the key image.

The key image select module 231 may select a key image by using a calendar screen in which the dates of creation (imaging) of still images 51 are positively indicated on a calendar. The key image select module 231 determines, for example, the still image 51, which was created on the date designated by the user from the calendar screen, to be the key image.

Further, the key image select module 231 may determine, for example, a face image, which is selected by the user, to be a key face image. In this case, a still image relevant to a person corresponding to the key face image is extracted from the material database 301, and still images including the extracted still image are used for the creation of the moving picture (photo movie or slide show).

The relevant image select module 233 selects (extracts) one or more still images, which are relevant to the key image (key face image), from the still images 51 stored in the material database 301. The still image relevant to the key image has relevance to the key image with respect to, e.g. the date/time, person or location. The relevant image select module 233 extracts the still images relevant to the key image, for example, by using the index information 302A stored in the material information database 302. The relevant image select module 233 comprises a date/time relevant image select module 233A, a person relevant image select module 233B and a location relevant image select module 233C.

The date/time relevant image select module 233A selects (extracts), from the still images 51 stored in the material database 301, still images having the date/time of generation which is relevant to the date/time of generation of the key image. For example, based on the index information 302A, the date/time relevant image select module 233A selects (extracts) still images which are generated during the same period (the period designated by, e.g. a day, a month, a time of year, a season, or a year) as the date/time of generation of the key image. In addition, for example, based on the index information 302A, the date/time relevant image select module 233A selects (extracts) still images which are generated during the same day, the same week, the same month, etc. (e.g. the same day of the previous year, or the same month two years later) during a period different from the date/time of generation of the key image.

The person relevant image select module 233B selects (extracts) still images which are relevant to a key face image (a face image included in a key image), from the still images 51 stored in the material database 301. The still images relevant to the key face image include, for example, a still image including a face image of the same person as the key face image, and a still image including a face image of another person relevant to the person corresponding to the key face image. Other persons relevant to the person corresponding to the key face image include, for example, a person included in the same still image as the key face image.

The location relevant image select module 233C selects (extracts) still images which are generated at a location relevant to the location of generation of the key image, from the still images 51 stored in the material database 301.

The scenario determination module 234 determines a scenario of a moving picture that is to be created (e.g. photo movie). The scenario includes, for example, information (scenario information) indicative of effects which are respectively used in a plurality of chapters (time segments) in a moving picture sequence that is to be created, and attributes of still images. Specifically, the scenario determination module 234 selects effects and still image attributes with respect to each of time segments, which are called "chapters", in the scenario.

In the present embodiment, for example, 24 kinds of scenario information are stored in advance in an effect database 303 as scenario data 303C. The scenario determination module 234 determines one of the 24 kinds of scenario information to be a scenario which is used for the creation of the moving picture (e.g. photo movie).

The determination of the scenario may be executed according to the style selected by the user. In other words, the scenario information to be used is determined in accordance with the selected style. In the embodiment, for example, eight kinds of styles (Happy, Fantastic, Ceremonial, Cool, Travel, Party, Gallery, Biography) are prepared in advance. In addition, for example, three kinds of scenario information are prepared in advance in association with each of the styles. The scenario determination module 234 automatically selects an arbitrary one of the three kinds of scenario information corresponding to the style selected by the user, and determines the selected scenario information to be the scenario of the moving picture (e.g. photo movie) that is to be created. Instead of the user selecting the style, the scenario determination module 234 may automatically select an arbitrary one of the eight kinds of styles. In this case, the style to be used may be determined, for example, based on the features of the still images extracted by the relevant image select module 233 (e.g. the number of appearing persons (the number of face images), the smile degree of the face image, etc.)

As described above, an arbitrary one of the three kinds of scenario information corresponding to the selected style is selected as a scenario of the moving picture (e.g. photo movie) that is to be created. It is possible to use, for example, a random number when this scenario is selected. Thereby, even if the same style is selected, photo movies can be created by using different scenarios at each time. The attribute of the still images, which are used for the creation of the photo movie, varies depending on the scenario that is used. Therefore, to change the scenario that is used may increase the possibility that unexpected still images are found and shown to the user.

Furthermore, the scenario determination module 234 determines music which is used for the creation of the photo movie. In the embodiment, a plurality of music are stored in the music database 304 as audio data 303B. The scenario determination module 234 determines the music that is to be used, for example, in accordance with the selected style, or in accordance with the features (e.g. the number of appearing persons (the number of face images)) of the still images extracted by the relevant image select module 233. The music to be used may be designated by the user.

When the style is selected by the user, the relevant image select module 233 can select (extract) still images relating to the style from the still images 51 stored in the material database 301, in accordance with the image extraction condition which is set for each of the styles.

Based on the still images stored in the material database 301, the moving picture generation module 235 generates a photo movie or a slide show according to a display mode.

When the display mode is a photo movie, the moving picture generation module 235 creates a photo movie, based on the scenario information which is determined by the scenario determination module 234. In this case, the moving picture generation module 235 selects, from the still images extracted by the relevant image select module 233, at least one still image corresponding to the still image attribute of each chapter indicated by the scenario information. The moving picture generation module 235 creates the photo movie by allocating the at least one still image, which has been extracted, to each chapter.

When the display mode is a slide show, the moving picture generation module 235 extracts a still image that is a display target, for example, at random, from the still images extracted by the relevant image select module 233.

When the moving picture generation module 235 creates the slide show, the moving picture generation module 235 may use the scenario information, as in the case of the creation of the photo movie. In this case, the moving picture generation module 235 selects, from the still images extracted by the relevant image select module 233, at least one still image corresponding to the still image attribute of each chapter indicated by the scenario information. The moving picture generation module 235 creates the slide show by allocating the at least one still image, which has been extracted, to each chapter, that is, determines the still images to be used and the order of playback of the still images.

As regards the photo movie, the moving picture playback module 236 plays back the photo movie by applying the effect corresponding to each chapter, which is indicated by the scenario information, to the still image allocated to each chapter. As regards the slide show, the moving picture playback module 236 plays back the still images which are successively extracted by the moving picture creation module 235.

The power supply monitor module 24 monitors the power supply state via the EC/KBC 113 and power supply circuit 115, and informs the playback control module 23 of the power supply state. The processing load of the playback of the photo movie by the playback control module 23 is great, because of, e.g. the application of the effect to still images. When the personal computer 10 is battery-driven, the power consumption increases due to the playback of the photo movie and the time in which battery driving is enabled decreases. The power supply monitor module 24 informs the playback control module 23 of the power supply mode in which the personal computer 10 is battery-driven or the AC adapter 115b is connected, and the power supply state, such as a residual capacity of the battery 115a at the time of battery driving, thereby making it possible to change the number of times of playback of the photo movie or the time of playback of the photo movie.

The setup module 25 executes setup for controlling the playback of the moving picture (slide show, photo movie) which is played back by the playback control module 23. The setup module 25 displays a slide show/photo movie setup screen in accordance with a request from the user. On the setup screen, as regards the slide show, the image switching interval (e.g. in the range of 1 to 300 seconds) and the presence/absence of the display of the date of still images can be set. As regards the photo movie, the timing of the playback start of the photo movie can be set. For example, "continuous playback" or "no playback" of the photo movie can be set, and the playback interval can be designated by time. For example, "every 15 minutes", "every 30 minutes" or "every one hour" can be set. Furthermore, the time of playback can be designated. For example, "every hour: ○○ minute(s)", or "○○ hour: ○○ minute(s)" can be set. It is also possible to designate the range of an effective time, like "from ○○ hour to ○○ hour". Besides, "random" or a specified date/time, "○ month, ○ day, ○ hour, ○ minute(s)", may be set. The setup module 25 records the setup information indicative of the setup content according to the user's designation. The playback control module 23 refers to the setup information which is set by the setup module 25, and starts the playback of the photo movie in accordance with the timing of the playback start. In the meantime, as regards the slide show, like the photo movie, the timing of the playback start may be set.

Figure 6:
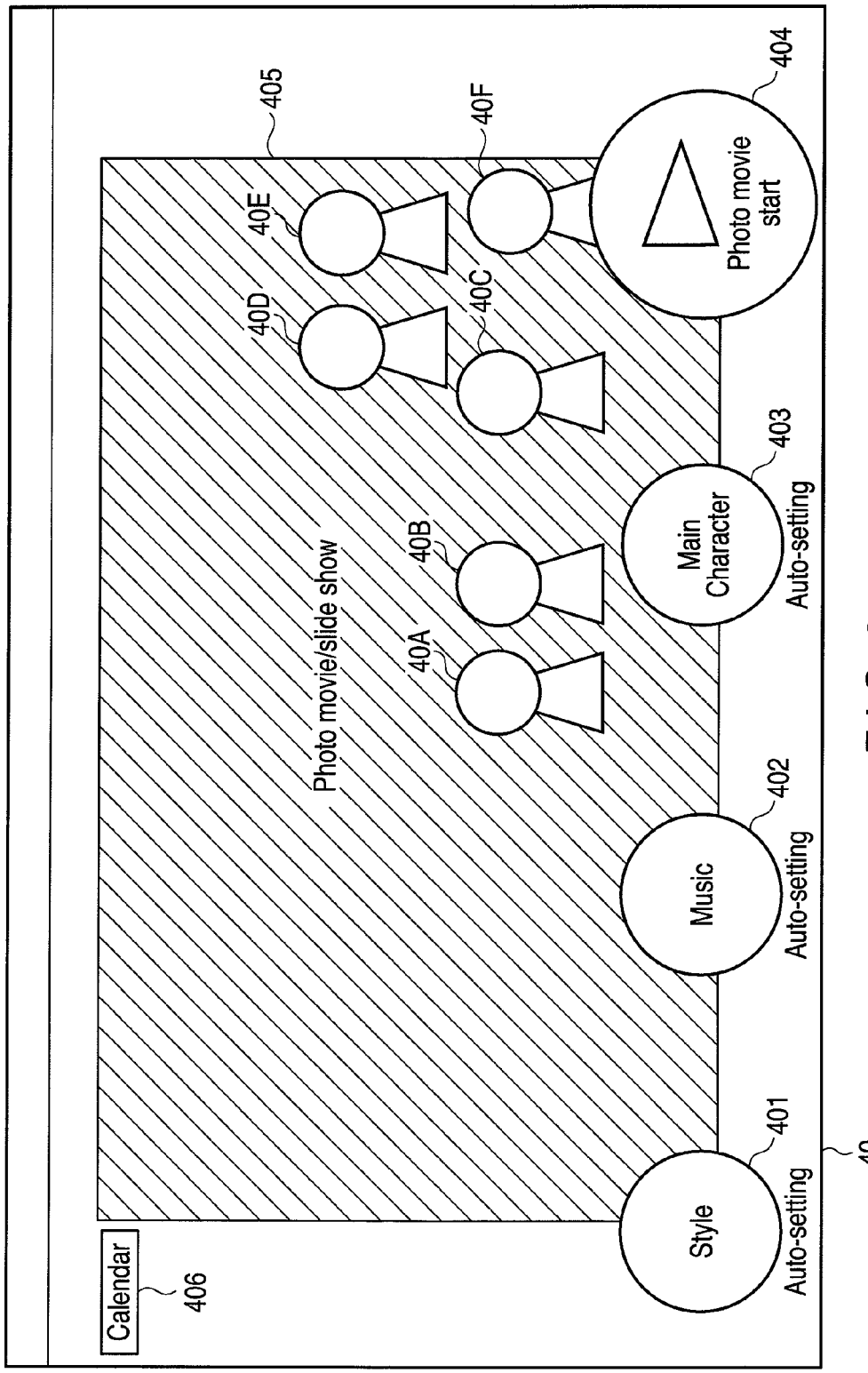
FIG. 6 is an exemplary view showing an example of a main screen which is displayed by the electronic apparatus of the embodiment.

FIG. 6 shows an example of a main screen 40 which is displayed by the moving picture creation application program 202.

The main screen 40 includes, for example, a "style" button 401, a "music" button 402, a "protagonist" button 403, a "start" button 404, a movie playback screen 405, and a "calendar" button 406.

The movie playback screen 405 is a screen for displaying a generated photo movie or slide show. On the movie playback screen 405, the photo movie or slide show, which is generated by the playback control module 23 (moving picture generation module 235), is successively played back and displayed. FIG. 6 shows an example in which persons 40A to 40F appear on the photo movie or slide show, which is being played back.

If the moving picture creation application program 202 is started, the moving picture creation application program 202 starts playback of the slide show. When a timing has come to start the playback of the photo movie while the slide show is being played back, the playback control module 23 determines the last displayed still image of the slide show to be the key image, creates the photo movie based on this key image, and starts the playback of the photo movie in place of the slide show. If the playback of the photo movie ends, the playback control module 23 determines the last displayed still image of the photo movie to be the key image, creates the slide show based on this key image, and starts the playback of the slide show.

When the movie playback screen 405 has been clicked by the user's operation of the pointing device while the photo movie or slide show is being displayed, the moving picture creation application program 202 pauses the playback of the photo movie (slide show) and determines the image, which is currently played back, to be the key image. If the image, which is being displayed, is an image which is created by combining a plurality of still images, the moving picture creation application program 202 may determine one of these still images to be the key image. Needless to say, one of the plural still images, which has been clicked by the user, may be determined to be the key image.

The "protagonist" button 403 is a button for starting the selection of a person of interest (protagonist) in the generated photo movie (or slide show). Responding to the pressing of the "protagonist" button 403, the key image select module 231 displays a list of persons appearing in the key image (face image select screen). For example, after selecting the key image by using the movie playback screen 405, the user presses the "protagonist" button 403 and instructs the start of the selection of the key face image (i.e. the display of the face image select screen).

The face image select screen displays a list of face images included in a key image. The user selects the face image of the person of interest from the list on the face image select screen. The key image select module 231 determines the selected face image to be the key face image (protagonist). When an operation of selecting a face image with use of the face image select screen is not performed (e.g. when the "protagonist" button 403 is not pressed), the key image select module 231 may select, from among the face images included in the key image, a key image, which meets a predetermined condition, to be the key face image.

The "style" button 401 on the main screen 40 of FIG. 6 is a button for starting the selection of the style of the photo movie. Responding to the pressing of the "style" button 401, the photo movie creation program 202 displays a style select screen. The style select screen displays a list of the above-described eight kinds of styles (Happy, Fantastic, Ceremonial, Cool, Travel, Party, Gallery, Biography). The user can designate a desired style.

The "music" button 402 is a button for starting the selection of the music which is used for the photo movie. Responding to the pressing of the "music" button 402, the moving picture creation application program 202 displays the list of music (music select screen). The user can select desired music.

The "start" button 404 is a button for starting generation and playback of the photo movie. Responding to the pressing of the "start" button 404, the moving picture creation application program 202 starts the creation of the photo movie. Then, the moving picture creation application program 202 plays back the created photo movie, and displays the photo movie on the movie playback screen 405.

Figure 5:
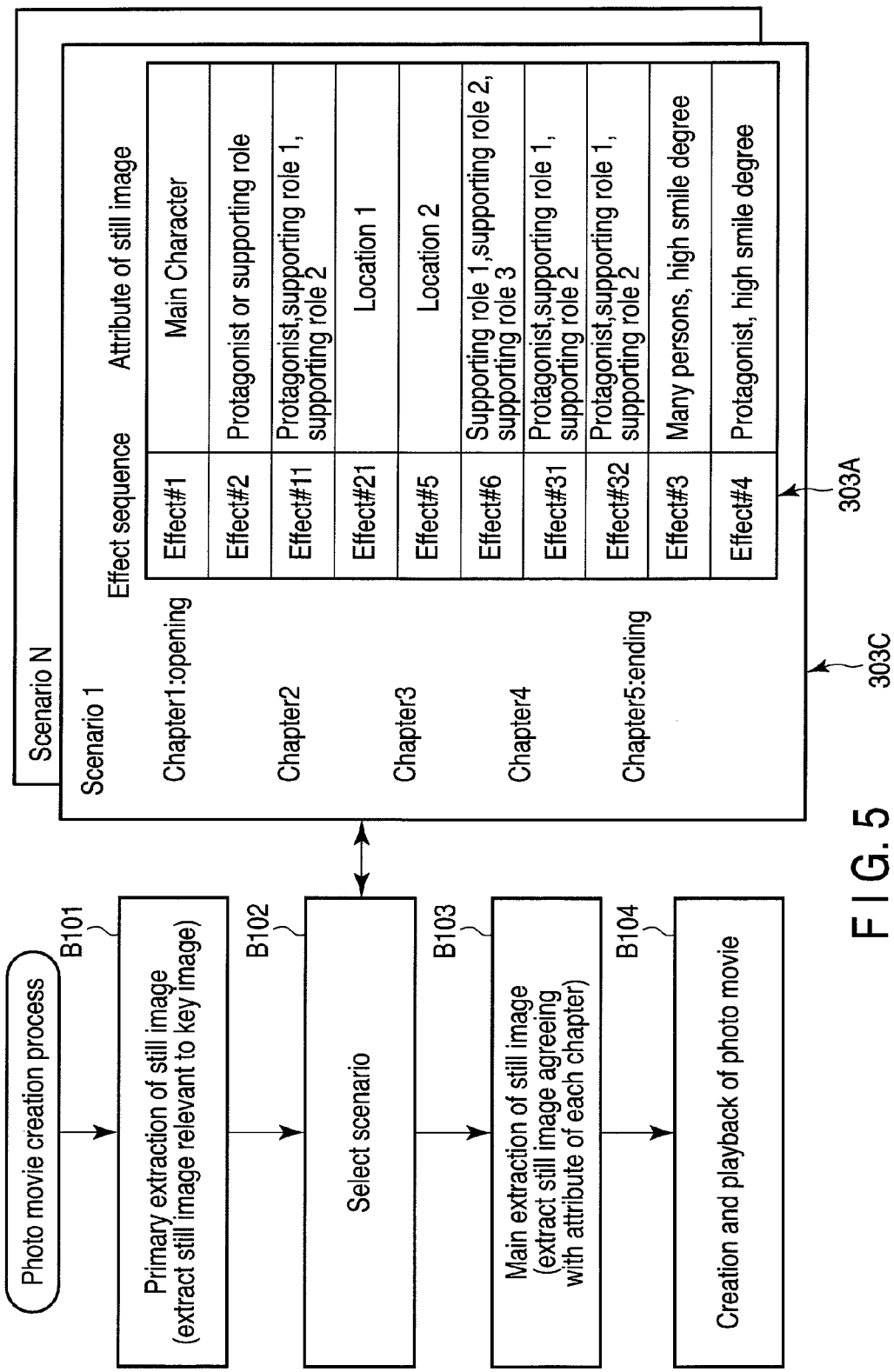
FIG. 5 is an exemplary conceptual view showing an example of a photo movie creation process which is executed by the electronic apparatus of the embodiment.

Next, referring to FIG. 5, the outline of the procedure of a photo movie creation process is described.

To start with, based on the index information, the moving picture creation application program 202 extracts (primary extraction) still images, which are relevant to a key image (key face image), from the material database 301 (block B101). In block B101, the moving picture creation application program 202 extracts, for example, still images relevant to a selected person (protagonist) from the material database 301.

Then, the moving picture creation application program 202 selects a scenario which is used for the creation of a photo movie (block B102). In block B102, the moving picture creation application program 202 selects one of a plurality of scenario information items which are prepared in advance, in accordance with the selected style or characteristic values of the still images extracted in block B101. Each scenario information item specifies the order of effects (effect sequence) which is used in a plurality of chapters (scenes) constituting the sequence of the photo movie, and the attributes of still images (still image attributes).

In FIG. 5, it is assumed that the sequence of the photo movie comprises five chapters (chapters 1, 2, 3, 4 and 5). Chapter 1 is an opening scene of the photo movie, and chapter 5 is an ending scene of the photo movie. One or more effects are defined in each chapter, and still image attributes are defined in association with each effect.

As the still image attributes, use may be made of, for example, person attributes (face attributes). For example, a protagonist (leading role), a supporting role, a smile degree, sharpness, and the number of appearing persons may be used as the person attributes. The term "leading role" refers to a person who is to become the protagonist of the photo movie, that is, a person (face) of interest. For example, the person corresponding to the above-described key face image may be determined to be the leading role. The term "supporting role" refers to another person relevant to the protagonist. For example, a person (face) with a high frequency of co-occurrence with the protagonist may be determined to be the supporting role. The person attribute may designate a plurality of supporting roles. A plurality of persons (faces) with a high frequency of co-occurrence with the protagonist may be determined to be the supporting roles. Not only the person attributes but also location attributes may be used as the still image attributes. The location attribute designates the location of imaging of still images which are used.

In scenario information 1 in FIG. 5, for example, two effects (Effect #1, Effect #2) are stipulated in chapter 1, and a still image attribute "Protagonist" is associated with Effect #1, and a still image attribute "Protagonist OR Supporting role" is associated with Effect #2. The still image attribute "Protagonist" designates that a still image in which the protagonist appears should be used. The still image attribute "Protagonist OR Supporting role" designates that a still image in which either the protagonist or supporting role appears should be used. Some other examples of the still image attributes are as follows.

Still image attributes "Protagonist, Supporting role", which are associated with Effect #11 of Chapter 2, designate that use should be made of a still image in which both the protagonist and supporting role appear. Still image attributes "Supporting role 1, Supporting role 2, Supporting role 3", which are associated with Effect #6 of Chapter 3, designate that use should be made of a still image in which all three supporting roles (supporting role 1, supporting role 2 and supporting role 3) appear. Still image attributes "Many persons, High smile degree", which are associated with Effect #3 of Chapter 5, designate that use should be made of a still image in which a number of persons, which is a threshold value of more, appear and the smile degree is high. Still image attributes "Protagonist, High smile degree", which are associated with Effect #4 of Chapter 5, designate that use should be made of a still image in which the protagonist appears and the smile degree of the protagonist is a threshold value or more. In this manner, the person attributes can designate that either the protagonist or the supporting role, or both the protagonist and supporting role should appear in each chapter.

Subsequently, the moving picture creation application program 202 further extracts (main extraction) one or more still images, which correspond to the still image attributes of each chapter indicated by the selected scenario information, from the still images extracted in block 101 (block B103). The moving picture creation application program 202 creates a photo movie by allocating the extracted still images to each chapter, and plays back the created photo movie (block B104). In block B104, the moving picture creation application program 202 applies the effect corresponding to each chapter, which is indicated by the scenario information, to the still images allocated to each chapter.

Figure 8:
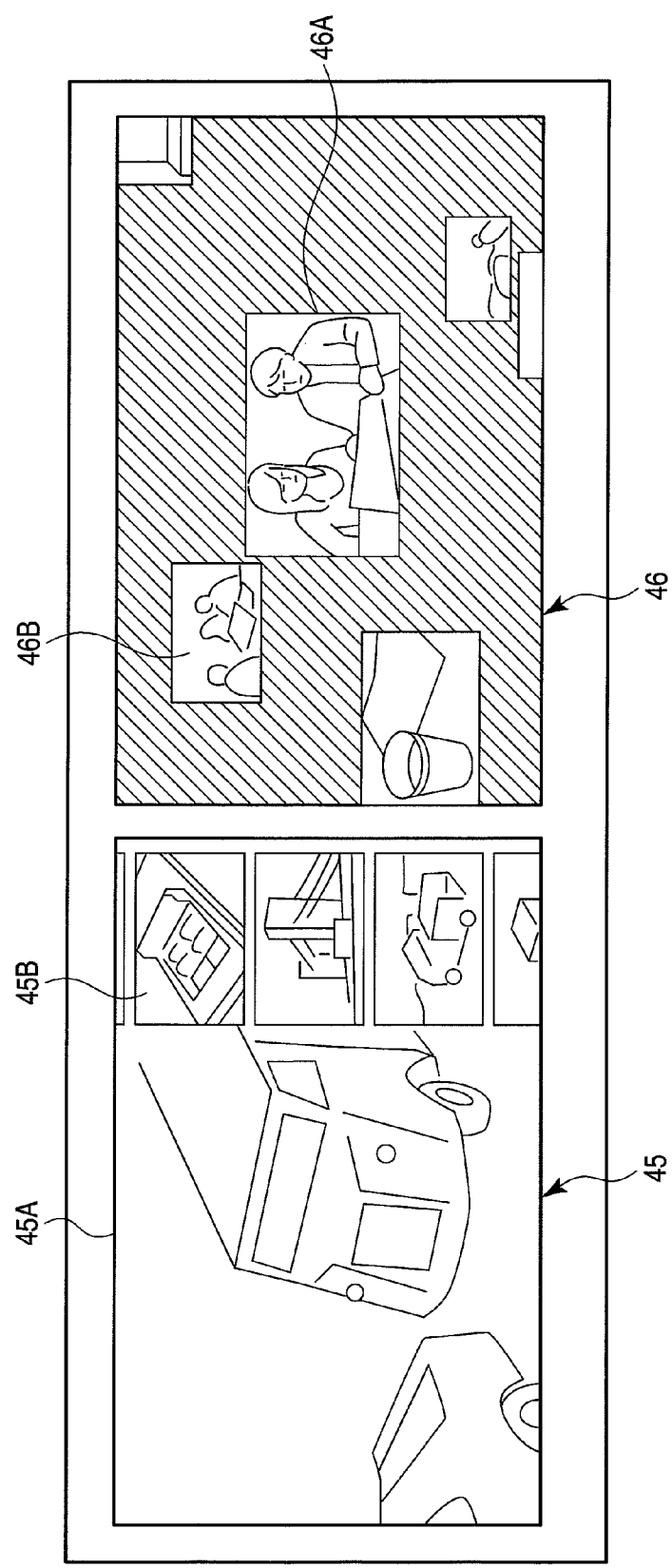
FIG. 8 is an exemplary view showing an example of a photo movie to which an effect has been applied, the photo movie being displayed by the electronic apparatus of the embodiment.

FIG. 7 and FIG. 8 show examples of the display of the photo movie.

FIG. 7 shows an example in which an effect is applied to emphasize a face image of a person appearing in a still image. On a screen 43, an effect 43B for emphasizing a person 43A is applied to the face image of the person 43A. The effect 43B superimposes an illustration, which surrounds the face image, on the face image. On the screen 44, an effect 44B, which puts a spot on the face image of a person 44A, is applied. The effect 44B darkens the region other than the face image of the person 44A.

FIG. 8 shows an example in which an effect is applied to a plurality of still images. On a screen 45 and a screen 46, an effect is applied to still images in order to display the still images by combining them. This effect determines the arrangement, sizes and motions of the still images.

Next, referring to a flowchart of FIG. 9, a description is given of an example of the procedure of a moving picture generation process which is executed by the moving picture creation application program 202. The moving picture creation application program 202 plays back a moving picture of either a photo movie or a slide show.

To start with, the key image select module 231 executes a key image select process (block B201). The key image select module 231 selects a key image from the still image data 51 stored in the material database 301. This key image is used as an extraction key for extracting, from the material database 301, still image data 51 which is used for a moving picture (photo movie or slide show) which is to be played back. The key image select module 231 outputs information indicative of the selected key image to the relevant image select module 233. The key image may be selected in accordance with the user's designation which is input via the calendar screen or face image select screen, or may be selected at random from still images which are to be displayed. In addition, a still image which is displayed when the moving picture creation application program 202 is started, or a still image, which is last selected in the previous playback of the moving picture, may be selected.

When the moving picture creation application program 202 is started, the display mode is set to be the slide show. By the user's operation, the display mode may be changed to the photo movie.

When the display mode is the slide show ("Slide show" in block B202), the relevant image select module 233 executes a relevant image select process by using the key image selected by the key image select module 231 (block B203). The relevant image select module 233 selects, from the material database 301, still image data 51 relevant to the key image with respect to, e.g. the date/time, person or location. Thereby, a still image group comprising a plurality of still images, which are playback targets of the slide show, is obtained.

If the still image group relevant to the key image is obtained by the relevant image select module 233, the moving picture generation module 235 extracts, for example, at random, still image data 51, which is to be displayed as the slide show, from the still image group from the material database 301, and outputs the extracted still image data 51 to the moving picture playback module 236 (block B204).

The moving picture playback module 236 displays the slide show on the movie playback screen 405 by using the still image data 51 extracted by the moving picture generation module 235.

In the meantime, when the slide show is played back, scenario information for the slide show may be determined by the scenario determination module 234, and the still images which are used for the slide show may be extracted from the material database 301 by using the scenario information. For example, in the scenario information for the slide show, only the still image attribute of the still images to be displayed is set. The moving picture generation module 235 extracts the still image data 51, which corresponds to the still image attribute, from the still image group relevant to the key image, and outputs the extracted still image data 51 to the moving picture playback module 236. Subsequently, the moving picture generation module 235 and the moving picture playback module 236 extract and display still images in accordance with an image switching interval which is set by the setup module 25, for example, at every five seconds. The playback control module 23 continues the playback of the slide show until a timing has come to start the playback of the photo movie (No in block B206).

The playback control module 23 monitors the timing of the playback start, which is set by the setup module 25. When the playback start timing of the photo movie has come, for example, when the playback time point designated by the user has come (Yes in block B206), the key image select module 231 determines the still image data 51, which is used at the last of the slide show by the moving picture playback module 236, to be a key image (block B207).

The playback control module 23 executes a photo movie creation process by using the still image data 51, which is used at the last of the slide show, as the key image, and executes the creation and playback of the photo movie. The process of block B208 to block B212 in FIG. 9 is executed in the same manner as the process of block B101 to B104 in FIG. 5, and a detailed description thereof is omitted.

When a transition to the photo movie has occurred while the slide show is being played back, the moving picture generation module 235 first extracts the still image (key image) which is displayed at the last of the slide show, and displays the extracted still image at the beginning of the photo movie. Thereby, the last image of the slide show becomes identical to the first image of the photo movie, and a transition from the slide show to the photo movie become natural (smooth).

The still image (key image), which is displayed at the last of the slide show, may not only displayed at the beginning of the photo movie, but may also be read out and displayed at a specific part of the photo movie, for example, a climax part (e.g. a part at which a special effect is applied) which is set in the scenario information of the photo movie.

The playback control module 23 plays back the photo movie corresponding to the number of chapters or the number of still images that are to be played back, which are determined according to the scenario information, or the hour/minute(s) corresponding to the length of music which is output in parallel with the photo movie (No in block B213).

If the playback of the photo movie ends (Yes in block B213), the key image select module 231 determines the still image data 51, which is used at the last of the photo movie by the moving picture playback module 236, to be a key image (block B214).

The playback control module 23 executes the above-described process of block B203 to block B205 by using the still image data 51, which is used at the last of the photo movie, as the key image, and executes the creation and playback of the slide show.

Thereby, like the transition from the slide show to the photo movie, the transition from the photo movie to the slide show can be made natural (smooth).

By the above-described process, the moving picture creation application program 202 can display the slide show using the still image data 51 relevant to the key image, and can execute the transition from the slide show to the photo movie when the timing to start the photo movie has come. If the playback of the photo movie ends, it is possible to return to the playback of the slide show. By using the still image data 51 relevant to the key image, the moving picture including unexpected still images, etc. can be presented to the user.

When the moving picture is played back and output by using the plural still image data 51 stored in the material database 301 by the moving picture creation application program 202, the photo movie and the slide show may be executed in a mixed fashion and thereby the audio-visual effect can be enhanced.

In the flowchart of FIG. 9, for example, after the timing (e.g. the time point set by the user) to start the playback of the photo movie has come, the still image primary extraction is started and the photo movie is created. In the photo movie creation process, the processing load is great since it is necessary to apply a plurality of effects, which are set in the scenario information, to the plural still images. Thus, if the photo movie creation process is started after the timing to start the playback of the photo movie has come, it is possible that a longer time than the image switching interval of the slide show is needed between the display of the last image of the slide show and the start of the playback of the photo movie. In this case, the user has such an impression that the display of the moving picture is paused.

Figure 10:
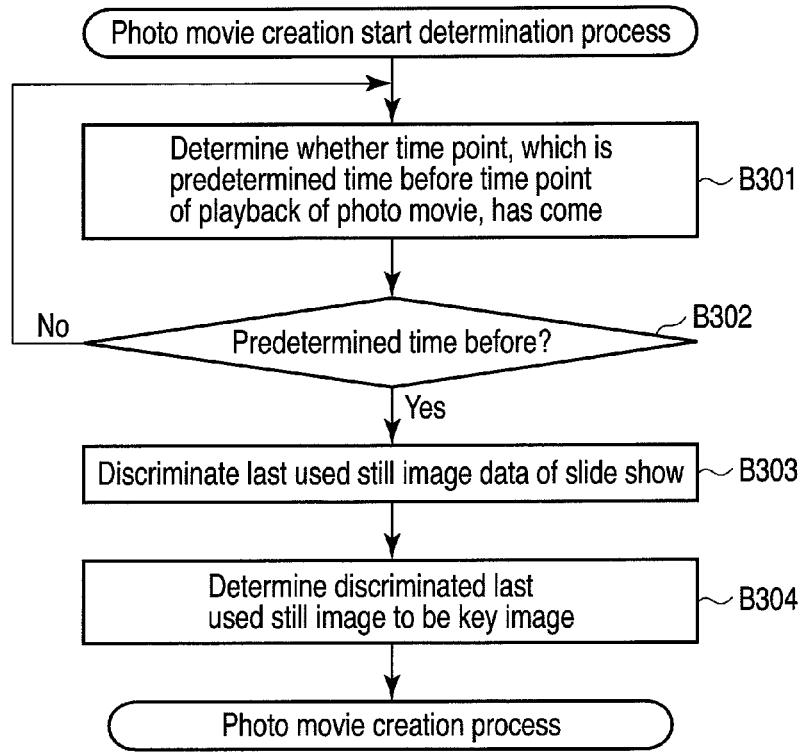
FIG. 10 is an exemplary flowchart illustrating an example of the procedure of a photo movie creation start determination process which is executed by the electronic apparatus of the embodiment.

To cope with this problem, by a photo movie creation start determination process illustrated in a flowchart of FIG. 10, the creation of the photo movie may be completed before the timing to start the playback of the photo movie has come.

The playback control module 23 executes the photo movie creation start determination process while the playback of the slide show is being executed. The playback control module 23 refers to the setup information which is set by the setup module 25, and determines whether a time point, which is a predetermined time before a time point to start playback of the photo movie, has come (block B301). The predetermined time is a sufficient time in which the photo movie can be created by the photo movie creation process. It is desirable, however, that the time between the end of the photo movie creation process and the start of the playback of the photo movie (the end of the playback of the slide show) be as short as possible. Specifically, if a new key image is designated or a style is designated by the user's operation after the photo movie creation process is started, a new photo movie creation process needs to be executed, and the processing result of the photo movie creation process up to that time would become useless.

If the time point, which is the predetermined time before the time point to start the playback of the photo movie, has come (Yes in block B302), the playback control module 23 discriminates the still image data 51 that is last used in the slide show. In the slide show, still images are displayed one by one in accordance with the image switching interval that is set by the setup module 25. Thus, the playback control module 23 calculates the number of still images which are displayed until the playback of the photo movie is started, and selects this number of still images which are to be displayed. Thereby, the playback control module 23 can specify the last displayed still image of the slide show.

The key image select module 231 determines the last displayed still image of the slide show to be a key image (block B304). Subsequently, as described above, the photo movie is created by the photo movie creation process, based on the key image.

Figure 11:
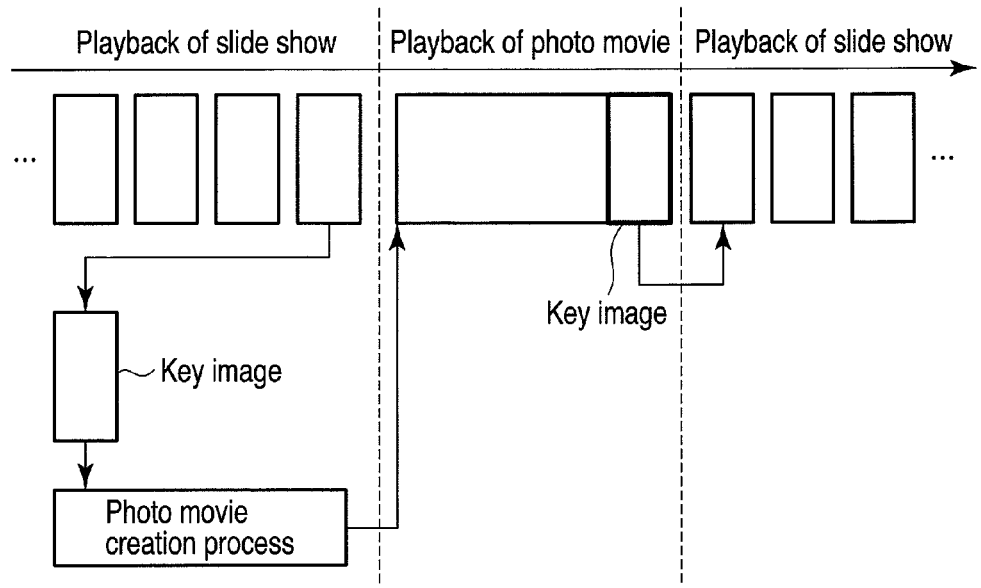
FIG. 11 is an exemplary view illustrating the photo movie creation start determination process which is executed by the electronic apparatus of the embodiment.

FIG. 11 is an exemplary view for describing the photo movie creation start determination process.

As shown in FIG. 11, while the slide show is being played back, the last displayed still image of the slide show is determined, and the photo movie creation process is executed by using this still image as the key image. In this photo movie creation process, the creation of the photo movie is completed before the timing to start the playback of the photo movie. Thus the start of playback of the photo movie does not delay unnecessarily.

When a transition occurs from the photo movie to the slide show, the processing load is not great. Thus, as shown in FIG. 11, in accordance with the timing of the playback start of the slide show, for example, the last displayed still image of the photo movie may be displayed at the beginning of the slide show.

In addition, in the above description, the playback of the photo movie is started at the timing set by the setup module 25 in accordance with the user's designation. However, the number of times of playback of the photo movie or the playback time of the photo movie may be adjusted, as described below, in accordance with the power supply state which is monitored by the power supply monitor module 24.

(A) Case in which the AC adapter 115b is connected and power is received from an external power supply.

(a1) The photo movie is played back in accordance with the setup information which is set by the setup module 25.

(a2) The photo movie is played back at all times, regardless of the setup information.

(a3) The number of times of playback of the photo movie is made greater than the setup content of the setup information. For example, when the playback at every 30 minutes is set, the photo movie is played back at every 15 minutes.

(a4) The playback time of one-time playback of the photo movie is increased.

(B) Case in which battery driving is executed since the AC adapter 115b is not connected.

(b1) When the residual capacity of the battery 115a is sufficiently greater than a preset threshold value, the photo movie is played back in accordance with the setup information which is set by the setup module 25.

(b2) When the residual capacity of the battery 115a is less than the preset threshold value, the number of times of playback of the photo movie is made less than the setup content of the setup information. For example, when the playback at every 15 minutes is set, the photo movie is played back at every 30 minutes.

(b3) As the residual capacity of the battery 115a becomes smaller, the playback interval of the photo movie is made longer. For example, when the residual battery capacity has decreased to ¾, the playback at every 15 minutes, which is set by the setup information, is changed to the playback at every 30 minutes. When the residual battery capacity has decreased to ½, the playback interval is changed to every one hour. When the residual battery capacity has decreased to ¼, the playback of the photo movie is stopped and only the slide show is played back.

(b4) When a transition has occurred to the battery driving, or when the residual battery capacity has decreased to below the preset threshold value, the execution of playback of the photo movie is disabled in the setup information, and the slide show is played back at all times.

(b5) When a transition has occurred to the battery driving, or when the residual battery capacity has decreased to below the preset threshold value, the time of one-time playback of the slide show is decreased.

The above-described examples of adjustment may be executed singly or in combination.

By adjusting the number of times of playback or the playback time of the photo movie according to the power supply condition, as described above, it becomes possible to avoid a sharp decrease in capacity of the battery 115a due to the playback of the moving picture, thereby securing the operable time of the personal computer 10 and maintaining the audio-visual effect by the playback of the photo movie and slide show in a mixed fashion.

In the above-described moving picture generation process, when a transition occurs from the slide show to the photo movie, the last still image of the slide show is determined to be the key image. Alternatively, the key image may be selected from several still images from the last one. Similarly, when a transition occurs from the photo movie to the slide show, the key image may be selected from several still images from the last one of the photo movie. Depending on the display mode of the photo movie or slide show, there may be a case in which the last still image gives no impression to the user. Thus, by selecting the key image from several still images from the last one, the same advantageous effect can be obtained.

Although a single still image is used as the key image, two or more still images may be used as key images.

All the procedures of the playback process in this embodiment may be executed by software. Thus, the same advantageous effects as with the present embodiment can easily be obtained simply by installing a program, which executes the procedures of the playback process, into an ordinary computer through a computer-readable storage medium which stores the program, and executing this program.

The functions of the respective components shown in FIG. 3 may be realized by hardware such as a purpose-specific LSI or a DSP.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a select module configured to select a style from a plurality of styles based on a user operation;
a determination module configured to determine scenario information item used for a playback of a moving picture from a plurality of scenario information items which are prepared in advance for the style;
a first playback module configured to play back a first moving picture by using a first still image group which is extracted from a plurality of still images according to the scenario information item;
an indexing module configured to generate index information indicative of attributes of the plurality of still images;
a first image select module configured to select a first still image from the first image group;
a first image extraction module configured to extract a second still image group from the plurality of still images based on the index information, the second still image group comprising still images related to the first still image;
a second playback module configured to play back a second moving picture by using the second still image group, in place of the first moving picture; and
a first moving picture generation module configured to allocate one or more still images of the still images in the second still image group to each of a plurality of time segments of the second moving picture,
wherein the scenario information item comprises effect information indicative of an effect used in each of the plurality of time segments, and
the second playback module is configured to apply the effect to the one or more still images allocated to each of the plurality of time segments while playing back the second moving picture.

2. The electronic apparatus of claim 1, wherein the first still image is a last displayed still image of the first moving picture.

3. The electronic apparatus of claim 2, wherein the second playback module is configured to play back the first still image at a beginning of the second moving picture.

4. The electronic apparatus of claim 1, further comprising:
a second image select module configured to select a second still image which is last displayed in the second moving picture; and
a second image extraction module configured to extract a third still image group from the plurality of still images based on the index information, the third still image group comprising still images related to the second still image,
wherein the first playback module is configured to play back the first moving picture by using the third still image group.

5. The electronic apparatus of claim 1, further comprising a setup module configured to set a timing to start playback of the second moving picture.

6. The electronic apparatus of claim 5, further comprising a second moving picture generation module configured to generate the second moving picture comprising the second still image group, before the timing set by the setup module,
wherein the second playback module is configured to start the playback of the second moving picture in accordance with the timing.

7. The electronic apparatus of claim 1, further comprising a power supply monitor module configured to monitor a power supply state,
wherein the second playback module is configured to play back the second moving picture in accordance with the power supply state.

8. An image processing method comprising:
selecting a style from a plurality of styles based on a user operation;
determining scenario information item used for a playback of a moving picture from a plurality of scenario information items which are prepared in advance for the style;
playing back a first moving picture by using a first still image group which is extracted from the plurality of still images according to the scenario information item;
generating index information indicative of attributes of the plurality of still images;
selecting a first still image from the first image group;
extracting a second still image group from the plurality of still images based on the index information, the second still image group comprising still images related to the first still image;
playing back a second moving picture by using the second still image group, in place of the first moving picture; and
allocating one or more still images of the still images in the second still image group to each of a plurality of time segments of the second moving picture,
wherein the scenario information item comprises effect information indicative of an effect used in each of the plurality of time segments, and
playing back the second moving picture comprises applying the effect to the one or more still images allocated to each of the plurality of time segments while playing back the second moving picture.

9. The method of claim 8, wherein the first still image is a last displayed still image of the first moving picture.

10. The method of claim 9, wherein playing back the second moving picture comprises playing back the first still image at a beginning of the second moving picture.

11. The method of claim 8, further comprising:
selecting a second still image which is last displayed in the second moving picture;
extracting a third still image group from the plurality of still images based on the index information, the third still image group comprising still images related to the second still image; and
playing back the first moving picture by using the third still image group.

12. The method of claim 8, further comprising setting a timing to start playback of the second moving picture.

13. The method of claim 12, further comprising:
generating the second moving picture comprising the second still image group, before the timing set by the setup module; and
starting the playback of the second moving picture in accordance with the timing.

14. The method of claim 8, further comprising:
monitoring a power supply state; and
playing back the second moving picture in accordance with the power supply state.

15. A non-transitory computer readable storage medium having stored thereon a computer program which is executable by a computer, the computer program controlling the computer to execute functions of:
selecting a style from a plurality of styles based on a user operation;
determining scenario information item used for a playback of a moving picture from a plurality of scenario information items which are prepared in advance for the style;
playing back a first moving picture by using a first still image group which is extracted from a plurality of still images according to the scenario information item;
generating index information indicative of attributes of the plurality of still images;
selecting a first still image from the first image group;
extracting a second still image group from the plurality of still images based on the index information, the second still image group comprising still images related to the first still image;
playing back a second moving picture by using the second still image group, in place of the first moving picture; and
allocating one or more still images of the still images in the second still image group to each of a plurality of time segments of the second moving picture,
wherein the scenario information item comprises effect information indicative of an effect used in each of the plurality of time segments, and
playing back the second moving picture comprises applying the effect to the one or more still images allocated to each of the plurality of time segments while playing back the second moving picture.

* * * * *